US011333988B2

(12) United States Patent
Biadglin et al.

(10) Patent No.: US 11,333,988 B2
(45) Date of Patent: May 17, 2022

(54) VARNISH COMPOSITIONS

(71) Applicant: HP Indigo B.V., Amstelveen (NL)

(72) Inventors: Getahun Biadglin, Ness Ziona (IL); Guy Nesher, Ness Ziona (IL); Ilanit Mor, Ness Ziona (IL); Haim Cohen, Ness Ziona (IL); Tony Azzam, Ness Ziona (IL); Samer Farran, Ness Ziona (IL); Yael Kowal-Blau, Ness Ziona (IL); Albert Teishev, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 560 days.

(21) Appl. No.: 15/568,809

(22) PCT Filed: Jun. 23, 2015

(86) PCT No.: PCT/EP2015/064097
§ 371 (c)(1),
(2) Date: Oct. 24, 2017

(87) PCT Pub. No.: WO2016/206724
PCT Pub. Date: Dec. 29, 2016

(65) Prior Publication Data
US 2018/0120717 A1    May 3, 2018

(51) Int. Cl.
*G03G 8/00* (2006.01)
*G03G 9/12* (2006.01)
*G03G 9/13* (2006.01)
*G03G 9/135* (2006.01)
*C09D 123/08* (2006.01)

(52) U.S. Cl.
CPC .......... *G03G 8/00* (2013.01); *C09D 123/0869* (2013.01); *G03G 9/122* (2013.01); *G03G 9/131* (2013.01); *G03G 9/132* (2013.01); *G03G 9/135* (2013.01)

(58) Field of Classification Search
CPC .... C09D 123/0869; G03G 8/00; G03G 9/122; G03G 9/131; G03G 9/132; G03G 9/135
See application file for complete search history.

(56) References Cited

U.S. PATENT DOCUMENTS

| | | | |
|---|---|---|---|
| 3,893,932 A * | 7/1975 | Azar | G03G 9/08755 430/110.2 |
| 5,192,638 A | 3/1993 | Landa et al. | |
| 6,267,950 B1 | 7/2001 | de la Poterie et al. | |
| 6,348,292 B1 | 2/2002 | Pan et al. | |

(Continued)

FOREIGN PATENT DOCUMENTS

WO      02060700      8/2002

OTHER PUBLICATIONS

International Search Report and Written Opinion dated Feb. 18, 2016 for PCT/EP2015/064097; Applicant Hewlett-Packard Indigo B.V.

*Primary Examiner* — Mark Ruthkosky
*Assistant Examiner* — Sathavaram I Reddy
(74) *Attorney, Agent, or Firm* — Thorpe North & Western LLP

(57) ABSTRACT

Provided in one example herein is a liquid electrophotographic varnish composition. The composition includes resin particles each including a polymeric resin mixture, which includes a first polymeric resin including an ethylene-based polymer; and a second polymeric resin including a polyamide. The composition also includes a carrier fluid.

14 Claims, 5 Drawing Sheets

(56) References Cited

U.S. PATENT DOCUMENTS

| | | |
|---|---|---|
| 7,338,986 B2 | 3/2008 | Ananthachar et al. |
| 7,396,588 B2 | 7/2008 | Wakizaka et al. |
| 8,440,379 B2 | 5/2013 | Roditi et al. |
| 2005/0165139 A1* | 7/2005 | Kawakami .............. C08J 3/16 524/17 |
| 2008/0299480 A1* | 12/2008 | Akioka .............. G03G 9/125 430/113 |
| 2013/0288175 A1 | 10/2013 | Chun et al. |

* cited by examiner

VARNISH COMPOSITIONS

BACKGROUND

One example of digital printing is electrophotographic printing. Liquid electrophotographic printing, or "LEP printing" is a specific type of electrophotographic printing, in which a liquid ink (or "LEP ink"), instead of a powder toner, is employed in the electrophotographic process.

BRIEF DESCRIPTION OF THE DRAWINGS

The drawings are provided to illustrate various examples of the subject matter described herein in this disclosure (hereafter "herein" for short, unless explicitly stated otherwise) related to a varnish composition, particularly one that is suitable for LEP printing, and are not intended to limit the scope of the subject matter. The drawings are not necessarily to scale.

DETAILED DESCRIPTION

Figure 1:
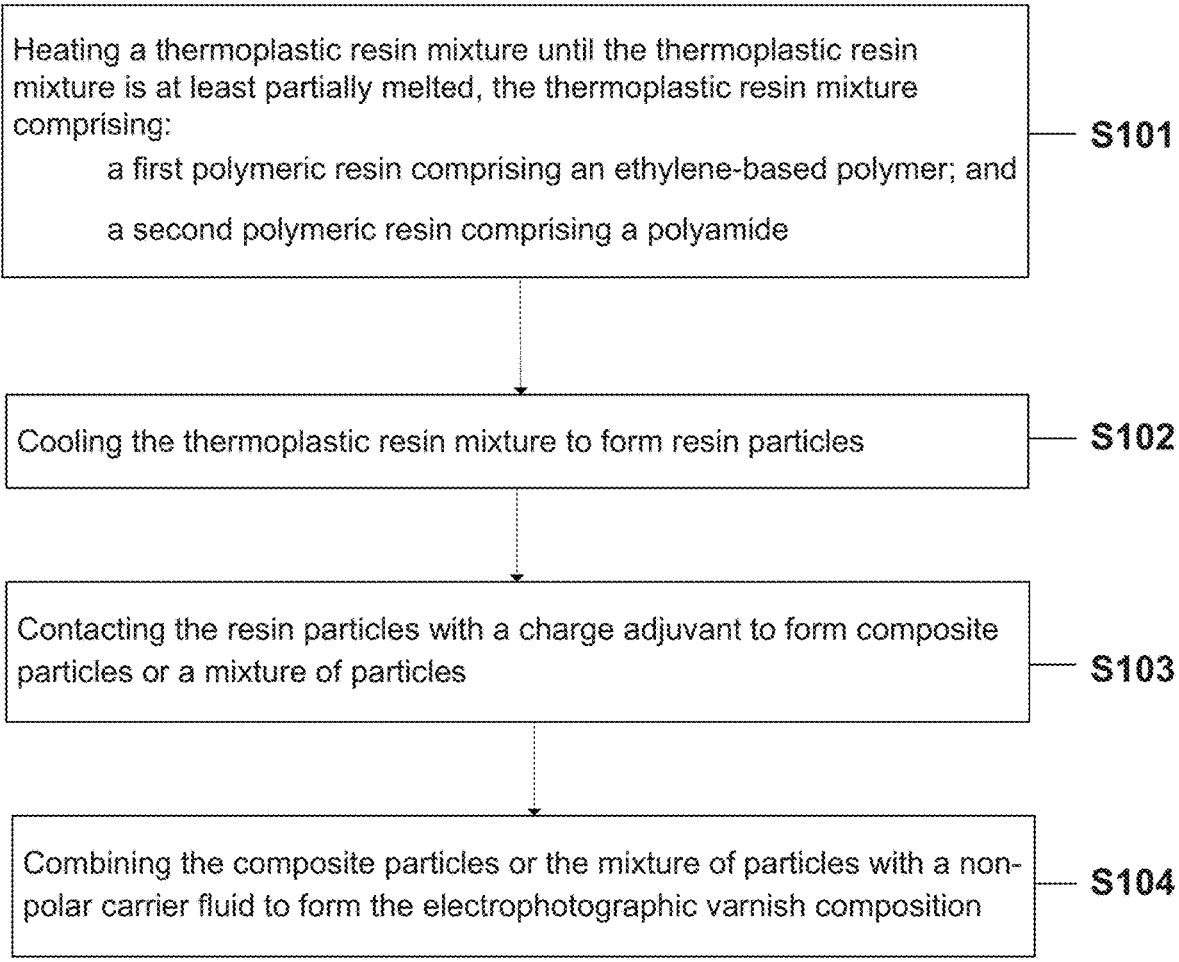
FIG. 1 provides a flowchart showing the processes involved in one example of a manufacturing method of the varnish composition described herein.

Electrophotographic printing processes, sometimes known as electrostatic printing processes, may involve creating an image on a photoconductive surface, applying a printing composition having charged particles to the photoconductive surface, such that they selectively bind to the image, and then transferring the charged particles in the form of the image to a print substrate.

The photoconductive surface may be on a cylinder and is also known as a photo imaging plate ("PIP"). The photoconductive surface is selectively charged with a latent electrostatic image having the image and the background areas with different potentials. For example, a printing composition comprising charged toner particles in a carrier fluid may be brought into contact with the selectively charged photoconductive surface. The charged toner particles adhere to the image areas of the latent image while the background areas remain clean. The image is then transferred to a print substrate (e.g. paper) directly, or by being first transferred to an intermediate transfer member, which may be a soft swelling blanket often heated to fuse the solid image and evaporate the carrier fluid, and then to the print substrate.

In some examples, a varnish is a transparent composition that may be designed to provide physical protection to an image or to achieve certain visual effects like high gloss, matting or selectively highlight certain elements. The varnish compositions for LEP thus far focus much on providing physical protection to the printed image aiming at highly durable prints. The durability of the pre-existing varnish compositions generally arises from the resins system which provides the matrix mechanical properties. As durability is a target, a resin with strong mechanical properties (e.g., structural integrity) is desired.

It has been found that some electrophotographic inks do not have the desired degree of durability, for example, in peeling, scratch, flaking, or rub tests, when printed on certain print substrates. This may sometimes be addressed by applying an electrophotographic varnish over the printed ink. Such varnishes may increase the durability of the image, for example, by increasing its scratch resistance. For example, when an epoxy-based crosslinking agent is employed in the varnish, the integrity or cohesion of the printed varnish layer may be enhanced as the polymer resins in the varnish composition is crosslinked by an interpenetrating network formed from the polymerized crosslinking agent. This may result in an increase in the scratch resistance of the printed image. However, varnishes may decrease the peel resistance of the printed image.

In view of the aforementioned challenges, the Inventors have recognized and appreciated the advantages of a varnish composition having desirable amount adhesion (to the substrate). Following below are more detailed descriptions of various examples related to a liquid electrophotographic varnish composition, particularly one with a polymeric resin comprising a polyamide. The various examples described herein may be implemented in any of numerous ways.

Provided in one aspect of the examples is a liquid electrophotographic varnish composition, comprising: resin particles each comprising a polymeric resin mixture, comprising: a first polymeric resin comprising an ethylene-based polymer; and a second polymeric resin comprising a polyamide; and a non-polar carrier fluid.

Provided in another aspect of the examples is a method of manufacturing an electrophotographic varnish composition, the method comprising: heating a thermoplastic resin mixture until the thermoplastic resin mixture is at least partially melted, the thermoplastic resin mixture comprising: a first polymeric resin comprising an ethylene-based polymer; and a second polymeric resin comprising a polyamide; and cooling the thermoplastic resin mixture to form resin particles; contacting the resin particles with a charge adjuvant to form composite particles or a mixture of particles; and combining the composite particles or the mixture of particles with a non-polar carrier fluid to form the electrophotographic varnish composition.

Provided in another aspect of the examples is an article, comprising: a substrate; and an image disposed over the substrate, the image comprising at least one layer of a printed liquid electrographic ink composition, and at least one layer of electrographic varnish composition printed over the printed electrographic ink composition; wherein the electrographic varnish composition comprises: resin particles each comprising a polymeric resin mixture, comprising: a first polymeric resin comprising an ethylene-based polymer; and a second polymeric resin comprising a polyamide.

The term "carrier fluid", "carrier liquid," "carrier," or "carrier vehicle" herein may refer to the fluid in which the polymers, particles, colorant, charge directors and other additives may be dispersed to form a liquid electrostatic composition or electrophotographic composition. The carrier liquids may include a mixture of a variety of different agents, such as surfactants, co-solvents, viscosity modifiers, and/or other possible ingredients.

The term "electrostatic ink composition" or "liquid electrophotographic composition" herein may refer to an ink composition that is suitable for use in an electrostatic printing process, also known as an "electrophotographic printing process." It may comprise ink particles, which may comprise a thermoplastic resin.

The term "varnish" herein may refer to at least substantially colorless, clear or transparent compositions at least substantially free from pigment. As the compositions are at least substantially free from pigment, they may be used as varnishes in the methods described herein without contributing a further subtractive effect on the CMYK inks that would substantially affect the color of an underprinted colored image. It will be understood that other effects such as gamut expansion, saturation and brightness nevertheless may be enhanced.

An electrophotographic varnish composition may be applied to an electrophotographically printed image to protect the image and/or set its optical appearance, for example, with a matt or gloss finish. The electrophotographic varnish composition may be applied to the entire substrate or, more commonly, to selected areas of the substrate, for example, solely to the printed areas or selected areas of the substrate that include the printed areas. The electrophotographic varnish composition may include chargeable particles of a resin, which may be as described herein, dispersed in a carrier liquid, which may be as described herein. The electrophotographic varnish composition may be transparent and may be substantially devoid of colorant (e.g. dye or pigment). The electrophotographic varnish may be printed electrophotographically over at least one layer of electrophotographically printed ink, for example, in the same print cycle.

The term "transparent" herein may be used to describe a composition that allows light to pass therethrough. In the context of an electrophotographic varnish composition, the term "transparent" may mean that the composition allows light to pass through it such that, when the electrophotographic varnish composition is electrographically printed over a printed image of at a thickness of 3 μm or less, for instance, 1.5 to 2 μm (e.g. 1.5 μm), the printed image is visible to the naked eye. In some examples, the electrophotographic varnish composition is transparent, whereby, when the electrophotographic varnish composition is electrographically printed over a printed image of at a thickness of 1.5 μm, the change in optical density of the varnished image is within ±0.05 of the optical density of the un-varnished image. Additionally or alternatively, the electrophotographic varnish composition is transparent, whereby, when the electrophotographic varnish composition is electrographically printed over a printed image of at a thickness of 1.5 μm, the colors in the varnished image are substantially the same as the colors in the unvarnished image. In some examples, the difference in the color(s) of the varnished and un-varnished image are small. Reference is made to ASTM D1729-96 (Reapproved 2009, which specifies the equipment and procedures for visual appraisal of colors and color differences of opaque materials that are diffusely illuminated. In some examples, the delta E (determined according to CIE94) between the colors of the varnished and un-varnished image may be 3 or less, for example, 2 or less. In some examples, the delta E (determined according to CIE94) may be 1.5 or less, for example, 1 or less.

The term "optical density" or "absorbance" herein may refer to a quantitative measure expressed as a logarithmic ratio between the radiation falling upon a material and the radiation transmitted through a material:

$$A_\lambda = -\log_{10}\left(\frac{I_1}{I_0}\right),$$

where $A_\lambda$ is the absorbance at a certain wavelength of light ($\lambda$), $I_1$ is the intensity of the radiation (light) that has passed through the material (transmitted radiation), and $I_0$ is the intensity of the radiation before it passes through the material (incident radiation). The incident radiation may be any suitable white light, for example, day light or artificial white light. The optical density or delta E of an image may be determined using established methods. For example, optical density and/or delta E may be determined using a spectrophotometer. Suitable spectrophotometers are available under the trademark X-rite.

The term "copolymer" refers to a polymer that is polymerized from at least two monomers.

The term "melt flow rate" may refer to the extrusion rate of a resin through an orifice of defined dimensions at a specified temperature and load, usually reported as temperature/load, e.g. 190° C./2.16 kg. Flow rates may be used to differentiate grades or provide a measure of degradation of a material as a result of molding. "Melt flow rate" herein may refer to that measured per ASTM D1238-04c Standard Test Method for Melt Flow Rates of Thermoplastics by Extrusion Plastometer. If a melt flow rate of a particular polymer or copolymer is specified herein, unless otherwise stated, it refers to the melt flow rate for that polymer or copolymer alone, in the absence of any of the other components of the LEP printing composition.

The term "acidity," "acid number," or "acid value" may refer to the mass of potassium hydroxide (KOH) in milligrams that neutralizes one gram of a substance. The acidity of a polymer or copolymer may be measured according to standard techniques, for example as described in ASTM D1386. If the acidity of a particular polymer or copolymer is specified, unless otherwise stated, it is the acidity for that polymer or copolymer alone, in the absence of any of the other components of the LEP printing composition.

The term "melt viscosity" may refer to the ratio of shear stress to shear rate at a given shear stress or shear rate. Testing may be performed using a capillary rheometer. A plastic charge is heated in the rheometer barrel and is forced through a die with a plunger. The plunger is pushed either by a constant force or at constant rate depending on the equipment. Measurements may be taken once the system has reached steady-state operation. One method used is measuring Brookfield viscosity at 140° C., units are mPa-s or cPoise ("CP"). In another method, the melt viscosity is measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer or copolymer is specified, unless otherwise stated, it is the melt viscosity for that polymer or copolymer alone, in the absence of any of the other components of the LEP printing composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

The term "electrostatic printing" or "electrophotographic printing" may refer to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing as described herein. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400 V/μm or more—e.g., 600-900 V/μm or more.

The term "colored" is used to refer to any color, including white and black.

The term "colored toner image" refers to an image formed from an LEP ink. An LEP ink may contain a pigment.

The term "substituted" herein may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

The term "heteroatom" herein may refer to nitrogen, oxygen, halogens, phosphorus, or sulfur.

The term "alkyl", or similar expressions such as "alk" in alkaryl, herein may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms for example.

The term "aryl" herein may refer to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms, or more, and may be selected from, phenyl and naphthyl.

To the extent applicable, the terms "first," "second," "third," etc. herein are merely employed to show the respective objects described by these terms as separate entities and are not meant to connote a sense of chronological order, unless stated explicitly otherwise herein.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Polymeric Resins

One example of the varnish composition, which may be liquid, herein may comprise resin particles and a carrier fluid. Each of the resin particles may comprise a polymeric resin mixture, comprising: a first polymeric resin comprising an ethylene-based polymer; and a second polymeric resin comprising a polyamide.

The resin particles may have any suitable geometry. The term "geometry" herein may refer to shape or size, depending on the context. Also, in the case where there are multiple resin particles present in the varnish composition, the size may refer to an average of the multiple particles. For example, the resin particles may be spherical, cylindrical, sheets, etc., or an irregular shape. In one example, the resin particles are spherical. Depending on the shape, the size may refer to length, width, diameter, radius, etc. In one example, the resin particles may have an average size that is smaller or equal to about 2 μm—e.g., smaller or equal to about 1.5 μm, about 1.0 μm, about 0.5 μm, or smaller. Other particle sizes are also possible.

Depending on the materials involved, the varnish composition described herein may have various (melt) viscosity values. In one example, the resin particles have a melt viscosity of less than or equal to about 300 CP—e.g., less than or equal to about 250 CP, about 200 CP, about 150 CP, about 100 CP, about 80 CP, about 60 CP, about 50 CP, or lower. Melt viscosity may be measured using standard established techniques. For example, the melt viscosity may be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

Not to be bound by any particular theory, but the varnish compositions described herein may exhibit superior adhesion while reducing viscosity due in part to the difference in polarity between the resin particles and carrier fluid. The pre-existing resin system utilizes strong polymers. The high molecular weight of the strong polymers often leads to a higher viscosity of the system, which in turn may result in a lower adhesion of the composition to paper. The varnish compositions described herein may preserve the durability properties of the strong polymers while reducing viscosity and enhancing adhesion.

First Polymeric Resin

The first polymeric resin may comprise any suitable polymeric material. The first polymer resin may comprise a thermoplastic polymer. A thermoplastic polymer is sometimes referred to as a thermoplastic resin. In some examples, the polymer may be selected from ethylene or propylene acrylic acid copolymers; ethylene or propylene methacrylic acid copolymers; ethylene vinyl acetate copolymers; copolymers of ethylene or propylene (e.g. about 80 wt % to about 99.9 wt %), and alkyl (e.g. C1 to C5) ester of methacrylic or acrylic acid (e.g. about 0.1 wt % to about 20 wt %); copolymers of ethylene (e.g. about 80 wt % to about 99.9 wt %), acrylic or methacrylic acid (e.g. about 0.1 wt % to about 20.0 wt %) and alkyl (e.g. C1 to C5) ester of methacrylic or acrylic acid (e.g. about 0.1 wt % to about 20 wt %); copolymers of ethylene or propylene (e.g. about 70 wt % to about 99.9 wt %) and maleic anhydride (e.g. about 0.1 wt % to about 30 wt %); polyethylene; polystyrene; isotactic polypropylene (crystalline); copolymers of ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl may have from 1 to about 20 carbon atoms, such as methyl methacrylate (e.g. about 50% to about 90%)/methacrylic acid (e.g. 0 wt % to about 20 wt %)/ethylhexylacrylate (e.g. about 10 wt % to about 50 wt %)); ethylene-acrylate terpolymers: ethylene-acrylic esters-maleic anhydride ("MAH") or glycidyl methacrylate ("GMA") terpolymers; ethylene-acrylic acid ionomers and combinations thereof.

The resin may comprise a polymer having acidic side groups. Examples of the polymer having acidic side groups are provided below. The polymer having acidic side groups may have an acidity of about 50 mg KOH/g or more, in some examples an acidity of about 60 mg KOH/g or more, in some examples an acidity of about 70 mg KOH/g or more, in some examples an acidity of about 80 mg KOH/g or more, in some examples an acidity of about 90 mg KOH/g or more, in some examples an acidity of about 100 mg KOH/g or more, in some examples an acidity of about 105 mg KOH/g or more, in some examples about 110 mg KOH/g or more, in some examples about 115 mg KOH/g or more. The polymer having acidic side groups may have an acidity of about 200 mg KOH/g or less, in some examples about 190 mg or less, in some examples about 180 mg or less, in some examples about 130 mg KOH/g or less, in some examples about 120 mg KOH/g or less. Acidity of a polymer, as measured in mg KOH/g may be measured using established standard procedures, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples about 30 g/10 minutes or less, in some examples about 20 g/10 minutes or less, in some examples about 10 g/10 minutes or less. In some examples, all polymers having acidic side groups and/or ester groups in the particles each individually have a melt flow rate of less than about 90 g/10 minutes, in some examples about 80 g/10 minutes or less, in some examples about 70 g/10 minutes or less, in some examples about 60 g/10 minutes or less, etc.

The polymer having acidic side groups may have a melt flow rate of about 10 g/10 minutes to about 120 g/10 minutes, in some examples about 10 g/10 minutes to about 70 g/10 minutes, in some examples about 10 g/10 minutes to about 40 g/10 minutes, in some examples about 20 g/10 minutes to about 30 g/10 minutes. The polymer having acidic side groups may have a melt flow rate of, in some examples, about 50 g/10 minutes to about 120 g/10 minutes, in some examples about 60 g/10 minutes to about 100 g/10 minutes. The melt flow rate may be measured using established standard procedures, for example as described in ASTM D1238.

The acidic side groups may be in free acid form or may be in the form of an anion and associated with at least one counterion, typically metal counterions, e.g. a metal selected from the alkali metals, such as lithium, sodium and potassium, alkali earth metals, such as magnesium or calcium, and transition metals, such as zinc. In one example, the polymer is an ethylene-based polymer. For example, the polymer having acidic sides groups may be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups may be a copolymer of ethylene and an ethylenically unsaturated acid of either acrylic or methacrylic acid, where the ethylenically unsaturated acid of either acrylic or methacrylic acid constitute from about 5 wt % to about 25 wt % of the copolymer, in some examples from about 10 wt % to about 20 wt % of the copolymer.

The first polymeric resin may comprise two different polymers having acidic side groups. The two polymers having acidic side groups may have different acidities, which may fall within the ranges mentioned above. In one example, the polymer of the first polymeric resin is a copolymer of ethylene and methacrylic acid. The resin may comprise a first polymer having acidic side groups that has an acidity of from about 10 mg KOH/g to 110 mg KOH/g, in some examples about 20 mg KOH/g to about 110 mg KOH/g, in some examples about 30 mg KOH/g to about 110 mg KOH/g, in some examples about 50 mg KOH/g to about 110 mg KOH/g, and a second polymer having acidic side groups that has an acidity of about 110 mg KOH/g to about 130 mg KOH/g.

The first polymeric resin may comprise two different polymers having acidic side groups: a first polymer that has acidic side groups and has a melt flow rate of about 10 g/10 minutes to about 50 g/10 minutes and an acidity of from about 10 mg KOH/g to about 110 mg KOH/g, in some examples 2 about 0 mg KOH/g to about 110 mg KOH/g, in some examples about 30 mg KOH/g to about 110 mg KOH/g, In some examples about 50 mg KOH/g to about 110 mg KOH/g, and a second polymer that has acidic side groups and has a melt flow rate of about 50 g/10 minutes to about 120 g/10 minutes and an acidity of about 110 mg KOH/g to about 130 mg KOH/g. The first and second polymers may be absent of ester groups.

The ratio of the first polymer having acidic side groups to the second polymer having acidic side groups may be from about 10:1 to about 2:1. The ratio may be from about 6:1 to about 3:1, in some examples about 4:1.

The first polymeric resin may comprise two different polymers having acidic side groups that are selected from copolymers of ethylene and an ethylenically unsaturated acid of either acrylic acid or methacrylic acid; or ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from about 8 wt % to about 16 wt % of the copolymer, in some examples about 10 wt % to about 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from about 12 wt % to about 30 wt % of the copolymer, in some examples from about 14 wt % to about 20 wt % of the copolymer, in some examples from about 16 wt % to about 20 wt % of the copolymer in some examples from about 17 wt % to about 19 wt % of the copolymer.

The first polymeric resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a copolymer of a monomer having ester side groups and a monomer having acidic side groups. The polymer may be a copolymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a copolymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute about 1% to about 50% by weight of the copolymer, in some examples about 5% to about 40% by weight, in some examples about 5% to about 20% by weight of the copolymer, in some examples about 5% to about 15% by weight of the copolymer. The second monomer may constitute about 1% to about 50% by weight of the copolymer, in some examples about 5% to about 40% by weight of the copolymer, in some examples about 5% to about 20% by weight of the copolymer, in some examples about 5% to about 15% by weight of the copolymer. The first monomer may constitute about 5% to about 40% by weight of the copolymer, the second monomer constitutes about 5% to about 40% by weight of the copolymer, and with the third monomer constituting the remaining weight of the copolymer. In some examples, the first monomer constitutes about 5% to about 15% by weight of the copolymer, the second monomer constitutes about 5% to about 15% by weight of the copolymer, with the third monomer constituting the remaining weight of the copolymer. In some examples, the first monomer constitutes about 8% to 12% by weight of the copolymer, the second monomer constitutes about 8% to about 12% by weight of the copolymer, with the third monomer constituting the remaining weight of the copolymer. In some examples, the first monomer constitutes about 10% by weight of the copolymer, the second monomer constitutes about 10% by weight of the copolymer, and with the third monomer constituting the remaining weight of the copolymer. The polymer may be selected from the Bynel® class of monomer, including Bynel® 2022 and Bynel® 2002, which are available from DuPont, USA.

The polymer having ester side groups may constitute about 1% or more by weight of the total amount of the resin polymers, e.g. thermoplastic resin polymers, in the liquid electrophotographic varnish composition and/or the varnish printed on the print substrate, e.g. the total amount of the polymer or polymers having acidic side groups and polymer having ester side groups. The polymer having ester side groups may constitute about 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples about 15% or more by weight of the total amount of the resin polymers, e.g. thermoplastic resin polymers, in some examples about 20% or more by weight of the total amount of the resin polymers, e.g. thermoplastic resin polymers, in some examples about 25% or more by weight of the total amount of the resin polymers, e.g. thermoplastic resin polymers, in some examples about 30% or more by weight of the total amount of the resin polymers, e.g. thermoplastic resin polymers, in some examples about 35% or more by weight of the total amount of the resin polymers, e.g. thermoplastic resin polymers, in the liquid electrophotographic composition and/or the varnish printed on the print substrate. The polymer having ester side groups may constitute from about 5% to about 50% by weight of the total amount of the resin polymers, e.g. thermoplastic resin polymers, in the liquid electrophotographic composition and/or the varnish printed on the print substrate, in some examples about 10% to about 40% by weight of the total amount of the resin polymers, e.g. thermoplastic resin polymers, in the liquid electrophotographic composition and/or the varnish printed on the print substrate, in some examples about 5% to about 30% by weight of the total amount of the resin polymers, e.g. thermoplastic resin polymers, in the liquid electrophotographic composition and/or the varnish printed on the print substrate, in some examples about 5% to about 15% by weight of the total amount of the resin polymers, e.g. thermoplastic resin polymers, in the liquid electrophotographic composition and/or the varnish printed on the print substrate in some examples about 15% to about 30% by weight of the total amount of the resin polymers, e.g. thermoplastic resin polymers, in the liquid electrophotographic composition and/or the varnish printed on the print substrate.

The polymer having ester side groups may have an acidity of about 50 mg KOH/g or more, in some examples an acidity of about 60 mg KOH/g or more, in some examples an acidity of about 70 mg KOH/g or more, in some examples an acidity of about 80 mg KOH/g or more. The polymer having ester side groups may have an acidity of 100 mg KOH/g or less, in some examples about 90 mg KOH/g or less. The polymer having ester side groups may have an acidity of about 60 mg KOH/g to about 90 mg KOH/g, in some examples about 70 mg KOH/g to about 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The ethylene-based polymer of the first polymeric resin may be any suitable material, including commercially available products. For example, the polymer, polymers, copolymer or copolymers of the first polymeric resin may in some examples be selected from the Nucrel™ family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynel® 2002, Bynel® 2014, Bynel® 2020 and Bynel® 2022, (available from E. I. du PONT)), the Aclyn® family of toners (e.g. Aclyn® 201, Aclyn® 246, Aclyn® 285, and Aclyn® 295), and the Lotader® family of toners (e.g. Lotader® 2210, Lotader® 3430, and Lotader® 8200 (available from Arkema)).

The number of ethylene-based polymers in the first polymeric resin may vary. In one example, the first polymeric resin comprise more than one ethylene-based polymers— e.g., at least two, three, four, or more. In another example, the first polymeric resin comprises only one ethylene-based polymer, the only one polymeric resin being the first polymeric resin. In another example, the polymeric resin (of the varnish) comprises only one polymeric resin comprising an ethylene-based polymer, the only one polymeric resin being the first polymeric resin that comprises the ethylene-based polymer.

The first polymeric resin may be present in each of the resin particles and the varnish composition at any suitable amount. In one example, the resin particles represent the solid constituent of the varnish composition. For example, the first polymeric resin may constitute about 5 to about 90%, in some examples about 50 to about 80%, the solids of the liquid electrophotographic varnish composition described herein. The percentage may refer to volume percentage or weight percentage, depending on the context. In one example, the percentage refers to weight percentage. In one example, the first polymeric resin constitutes about 60 wt % to about 95 wt %, in one example about 70 wt % to about 80 wt %, of the resin particles of the varnish composition described herein.

Second Polymeric Resin

The second polymeric resin in the varnish composition described herein may comprise any suitable material, depending on the application. For example, the second polymeric resin may be more polar than the first polymeric resin. The second polymeric resin may comprise a thermoplastic polymer. The second polymeric resin may comprise a polyamide. For example, the second polymeric resin may comprise a thermoplastic polyamide resin.

The polyamide of the second polymeric resin may be any suitable polymer having at least one amide moiety. For example, the second polymeric resin may comprise a dimer acid based polyamide resin. In one example, the second polymeric resin comprises an ethylenediamine. The polyamide-containing polymeric resin may be a commercially available product. For example, the second polymeric resin may be of the Versamid® family by BASF, Germany—e.g., Versamid® 959, Versamid® 750, Versamid® 728, Versamid® 759, Versamid® 744, etc. Other Versamid® polymeric resins are also possible. For example, the second polymer resin may be of the Macromelt® family by Henkel, Germany—e.g., Macromelt® 6201. Other Macromelt® polymeric resins are also possible. The polyamide-containing second polymeric resins described herein may have desirable level of adhesion ability to a wide range of substrates. For example, the polyamide-containing second polymeric resins described herein may enhance the adhesion of lower coverage prints.

The second polymeric resin may be present in each of the resin particles and the varnish composition at any suitable amount. In one example, the resin particles represent the solid constituent of the varnish composition. For example, the first polymeric resin may constitute about 5% to about 70%, in some examples about 10 to about 60%, the solids of the liquid electrophotographic varnish composition described herein. The percentage may refer to volume percentage or weight percentage, depending on the context. In one example, the percentage refers to weight percentage. In one example, the first polymeric resin constitutes about 10 wt % to about 50 wt %, in one example about 20 wt % to about 40 wt %, of the resin particles of the varnish composition described herein.

Carrier Liquid

In some examples, the varnish is or has been formed from an electrostatic varnish composition. Before application to the print substrate in the electrostatic printing process, the varnish may be an electrostatic varnish composition, which may be in dry form, for example in the form of flowable particles comprising the thermoplastic resin. In another example, before application to the print substrate in the electrostatic printing process, the electrostatic varnish composition may be in liquid form; and may comprises a carrier liquid in which is suspended particles of the thermoplastic resin. Generally, the carrier liquid may act as a dispersing medium for the other components in the electrostatic varnish composition. For example, the carrier liquid may comprise or be a hydrocarbon, silicone oil, vegetable oil, etc. The carrier liquid may include, but is not limited to, an insulating, non-polar, non-aqueous liquid that may be used as a medium for toner particles. The carrier liquid may include compounds that have a resistivity in excess of about $10^9$ ohm-cm. The carrier liquid may have a dielectric constant below about 5, in some examples below about 3.

The carrier liquid may include, but is not limited to, hydrocarbons. The hydrocarbon may include, but is not limited to, an aliphatic hydrocarbon, an isomerized aliphatic hydrocarbon, branched chain aliphatic hydrocarbons, aromatic hydrocarbons, and combinations thereof. Examples of paraffins and isoparaffins comprise those in the ISOPAR™ family (Exxon Mobil Corporation, USA), including, for example, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each available from EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each available from NIPPON OIL CORPORATION); IP Solvent 1620™ and IP Solvent 2028™ (each available from IDEMITSU PETROCHEMICAL CO., LTD.); Amsco OMS™ and Amsco 460™ (each available from AMERICAN MINERAL SPIRITS CORP.); and Electron, Positron, New II, Purogen HF (100% synthetic terpenes) (available from ECOLINK™). In other examples of a suitable carrier fluid, other hydrocarbons that may be used as the non-polar carrier fluid comprise those in the SOLTROL® family (available from Chevron Phillips Chemical Company, USA) or SHELLSOL® (available from Shell Chemicals, USA).

In one example, the non-polar carrier fluid comprises any of linear, branched, and cyclic alkanes having from about 6 to about 100 carbon atoms, inclusive; hydrocarbons having from 6 to 14 carbon atoms, inclusive; cycloalkanes having from 6 to 14 carbon atoms, inclusive (e.g., n-hexanes, heptanes, octane, dodecane, cyclohexane, etc.); t-butylbenzene; 2,2,4-trimethylpentane; isoparaffinic hydrocarbons; paraffinic hydrocarbons; aliphatic hydrocarbons; de-aromatized hydrocarbons; halogenated hydrocarbons; cyclic hydrocarbons; functionalized hydrocarbons; or combinations thereof. The hydrocarbon may comprise oils, examples of which may comprise, silicone oil, soy bean oil, vegetable oil, plant extracts, or combinations thereof. The hydrocarbon comprised in the non-polar carrier fluid may be substantially non-aqueous—i.e., comprising less than about 1 wt % water—e.g., less than about 0.5 wt %, about 0.2 wt %, or lower. In one example, the hydrocarbon comprises no water. Any of the carrier fluids described herein may be used alone or in combination.

Before printing, the carrier liquid may constitute about 20% to about 99.5% by weight of the electrostatic varnish composition, in some examples about 50% to about 99.5% by weight of the electrostatic varnish composition. Before printing, the carrier liquid may constitute about 40 to about 90% by weight of the electrostatic varnish composition. Before printing, the carrier liquid may constitute about 60% to about 80% by weight of the electrostatic varnish composition. Before printing, the carrier liquid may constitute about 90% to about 99.5% by weight of the electrostatic varnish composition, in some examples about 95% to about 99% by weight of the electrostatic varnish composition.

The varnish composition described herein, when printed on a print substrate, may be substantially free from carrier fluid—the printed (varnish) composition is described further below. In an electrostatic printing process and/or afterwards, the carrier fluid may be removed, e.g. by an electrophoresis processes during printing and/or evaporation, such that substantially just solids are transferred to the print substrate. Substantially free from carrier fluid may indicate that the varnish composition printed on the print substrate contains less than about 5 wt % carrier fluid, in one example, less than about 2 wt % carrier fluid, in one example less than about 1 wt % carrier fluid, in one example less than about 0.5 wt % carrier fluid, at least in liquid form. In one example, the printing varnish composition printed on the print substrate is free from carrier fluid, at least in liquid form.

Charge Director and Charge Adjuvant

The liquid electrophotographic varnish composition and/or the ink composition printed on the print substrate may comprise a charge director. A charge director may be added to an electrostatic composition to impart a charge of a desired polarity and/or maintain sufficient electrostatic charge on the particles of an electrostatic varnish composition. The charge director may comprise ionic compounds, including, but not limited to, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director may be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco™ 575), and glyceride salts (e.g. sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates. The charge director may impart a negative charge or a positive charge on the resin-containing particles of an electrostatic varnish composition.

The charge director may comprise a sulfosuccinate moiety of the general formula $[R_a—O—C(O))CH_2CH(SO_3^-)C(O))—O—R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a—O—C(O)CH_2CH(SO_3^-)C(O)—O—R_b]$, where each of $R_a$ and $R_b$ is an alkyl group, or other charge directors The sulfosuccinate salt of the general formula $MA_n$ may be an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. In one exmaple, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and $Al^{+3}$, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, $Bf$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate ("BBP").

In the formula $[R_a—O—C(O))CH_2CH(SO_3^-)C(O))—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O))CH_2CH(SO_3^-)C(O))—O—R_b]$ and/or the formula $MA_n$ may be as defined as above.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and may be obtained, for example, from Chemtura. An example isopropyl amine sulfonate salt is dodecyl benzene sulfonic acid isopropyl amine, which is available from Croda.

In an electrostatic varnish composition, the charge director may constitute about 0.001% to about 20%, in some examples about 0.01 to about 20% by weight, in some examples about 0.01 to about 10% by weight, in some examples about 0.01 to about 1% by weight of the solids of the electrostatic varnish composition and/or varnish printed on the print substrate. The charge director may constitute about 0.001 to about 0.15% by weight of the solids of the liquid electrophotographic varnish composition and/or varnish printed on the print substrate, in some examples about 0.001 to about 0.15%, in some examples about 0.001 to about 0.02% by weight of the solids of the liquid electrophotographic varnish composition and/or varnish printed on the print substrate. In some examples, the charge director imparts a negative charge on the electrostatic varnish composition. The particle conductivity may range from about 50 to about 500 μmho/cm, in some examples from about 200-about 350 μmho/cm.

The liquid electrophotographic varnish composition and/or varnish printed on the print substrate may include a charge adjuvant. A charge adjuvant may be present with a charge director, and may be different to the charge director, and act to increase and/or stabilize the charge on particles, e.g. resin-containing particles, of an electrostatic composition. The charge adjuvant may include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium, and ammonium salts, copolymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant may constitute about 0.1 to about 5% by weight of the solids of the liquid electrophotographic varnish composition and/or varnish printed on the print substrate. The charge adjuvant may constitute about 0.5 to about 4% by weight of the solids of the liquid electrophotographic varnish composition and/or varnish printed on the print substrate. The charge adjuvant may constitute about 1 to about 3% by weight of the solids of the liquid electrophotographic varnish composition and/or varnish printed on the print substrate.

Photo-Initiator

In some examples, the varnish composition comprises a photo-initiator. The photo-initiator, or UV initiator, is an agent that initiates a reaction upon exposure to a desired wavelength of UV light to cure the composition, as described herein, after its application to a substrate by cross-linking the polymer resin with the epoxy-based cross-linking agent. In some examples, the photo-initiator is a cationic photo-initiator or a radical photo-initiator. The photo-initiator may be a single compound or a mixture of two or more compounds. It may be present in the composition in an amount sufficient to cure the applied composition. In some examples, the photo-initiator is present in the composition in an amount representing from about 0.01 to about 10 wt %, or from about 1 to about 5 wt %. In one example the photo-initiator may be present in an amount of less than about 5 wt %, for example less than about 4 wt %, less than about 3 wt %, less than about 2 wt %, less than about 1 wt %.

In some examples, the photo-initiator is a cationic photo-initiator. Suitable examples of cationic photo-initiators are ESACURE 1064 (50% propylene carbonate solution of arylsulfonium hexafluorophosphate (mono+di) salts); diphenyliodonium nitrate; (tert-butoxycarbonylmethoxynaphthyl)-diphenylsulfonium triflate; 1-naphthyl diphenylsulfonium triflate; (4-fluorophenyl)diphenylsulfonium triflate; Boc-methoxyphenyldiphenylsulfonium triflate (all available from Sigma-Aldrich).

Examples of radical photo-initiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations of two or more of the above. Amine synergists may also be used, such as, for example, ethyl-4-dimethylaminobenzoate, 2-ethylhexyl-4-dimethylamino benzoate.

The varnish composition may include a UV stabilizer, i.e. an agent that may assist with scavenging free radicals. Examples of UV stabilizers include, by way of illustration and not limitation, quinine methide (Irgastab® UV 22 from BASF Corporation) and Genorad® 16 (Rahn USA Corporation) and combinations thereof. In some examples, a photosensitizer may be used with the photo-initiator in amounts ranging from about 0.01 to about 10 wt %, or from about 1 to about 5 wt %, based on the total weight of the varnish composition. A photosensitizer absorbs energy and then transfers it to another molecule, usually the photo-initiator. Photosensitizers are often added to shift the light absorption characteristics of a system. Suitable examples of photosensitizers include, but are not limited to, thioxanthone, 2-isopropylthioxanthone and 4-isopropylthioxanthone.

Cross-Linking Agent

In some examples, the epoxy-based crosslinking agent has a molecular weight of more than about 5000 Daltons. In some examples, the epoxy-based crosslinking agent has a molecular weight of about 5000 Daltons or less, in some examples about 4000 Daltons or less, in some examples, about 3000 Daltons or less, in some examples about 1500 Daltons or less, in some examples a molecular weight of about 1000 Daltons or less, in some examples a molecular weight of about 700 Daltons or less, in some examples a molecular weight of about 600 Daltons or less. In some examples, the crosslinking agent has a molecular weight of from about 100 to about 1500 Daltons, in some examples, in some examples a molecular weight of from about 100 to about 600 Daltons.

In one example, the epoxy-based crosslinking agent may be of the formula (I),

$$(X)-(Y-[Z-F]_m)_n \qquad \text{formula (I)}$$

wherein, in each $(Y-[Z-F]_m)_n$, Y, Z and F are each independently selected, such that F is an epoxide, e.g. group of the formula $-CH(O)CR^1H$, wherein $R^1$ is selected from H and alkyl; Z is alkylene, Y is selected from (i) a single bond, $-O-$, $-C(=O)-O-$, $-O-C(=O)-$ and m is 1 or (ii) Y is $-NH_{2-m}$, wherein m is 1 or 2, n is at least 1, in some examples at least 2, in some examples at least 3, in some examples 1 to 4, in some examples 2 to 4, and X is an organic group.

In some examples, the crosslinking agent of formula (I) has at least two F groups, in some examples at least three F groups, in some examples at least four F groups.

X may comprise or be an organic group selected from optionally substituted alkyl, optionally substituted aryl, optionally substituted arylalkyl, optionally substituted alkylaryl, isocyanurate, and a polysiloxane. X may comprise at least one polymeric component; in some examples the polymeric components may be selected from a polysiloxane (such as poly(dimethyl siloxane), a polyalkylene (such as polyethylene or polypropylene), an acrylate (such as methyl acrylate) and a poly(alkylene glycol) (such as poly(ethylene glycol) and poly(propylene glycol)), and combinations thereof. In some examples X comprises a polymeric backbone, comprising a plurality of repeating units, each of which is covalently bonded to $(Y-[Z-F]_m)$, with Y, Z, F and m as described herein. X may be selected from a group selected from trimethyl propane, a branched or straight-chain $C_{1-5}$ alkyl, phenyl, methylene bisphenyl, trisphenylmethane, cyclohexane, isocyanurate.

In some examples, X is selected from (i) an alkane, which may be an optionally substituted straight chain, branched or cyclo-alkane, (ii) a cyclo alkane having at least two substitutents that are $Y-[Z-F]_m$ and (iii) an aryl (such as phenyl). In some examples, X is selected from (i) a branched alkane, with at least at least two of the alkyl branches covalently bonded to $(Y-[Z-F]_m)$ and (ii) a cyclo alkane having at least two substitutents that are $Y-[Z-F]_m$ and (iii) an aryl (such as phenyl) having at least two substituents that are Y—[Z—F]$_m$; Y is selected from (i) —O—, —C(=O)—O—, —O—C(=O)— and m is 1 or (ii) Y is —NH$_{2-m}$, wherein m is 1 or 2; Z is C$_{1-4}$ alkylene; F is an epoxide of the formula —CH(O)CR$^1$H, wherein R$^1$ is selected from H and methyl, and in some examples F is an epoxide of the formula —CH(O)CR$^1$H in which R$^1$ is H.

In some examples, X is trimethyl propane, in which three methyl groups are each substituted with a (Y—[Z—F]$_m$) group (i.e. n is 3), in which Y is selected from —O—, —C(=O)—O—, —O—C(=O)— and m is 1, Z is Z is C$_{1-4}$ alkylene, in some examples methylene (—CH$_2$—) or ethylene (—CH$_2$—CH$_2$—); F is an epoxide of the formula —CH(O)CR$^1$H, wherein R$^1$ is selected from H and methyl, and in some examples F is an epoxide of the formula —CH(O)CR$^1$H in which R$^1$ is H.

In some examples, X is phenyl having at least two substituents that are (Y—[Z—F]$_m$) groups, in which each Y is independently selected from (i) —O—, —C(=O)—O—, —O—C(=O)— and m is 1 or (ii) Y is —NH$_{2-m}$, wherein m is 1 or 2; Z is C$_{1-4}$ alkylene, in some examples methylene or ethylene; F is an epoxide of the formula —CH(O)CR$^1$H, wherein R$^1$ is selected from H and methyl, and in some examples F is an epoxide of the formula —CH(O)CR$^1$H in which R$^1$ is H.

In some examples, Z—F is an epoxycycloalkyl group. In some examples, Z—F is an epoxycyclohexyl group. In some examples, the crosslinking agent comprises two or more epoxycycloalkyl groups, in some examples two or more epoxycyclohexyl groups. In some examples, the crosslinking agent comprises two or more epoxycycloalkyl groups, which are bonded to one another via a linker species; and the linker species may be selected from a single bond, optionally substituted alkyl, optionally substituted aryl, optionally substituted arylalkyl, optionally substituted alkylaryl, isocyanurate, a polysiloxane, —O—, —C(=O)—O—, —O—C(=O)—, and amino and combinations thereof. In some examples, in formula (I) Y is a single bond, X is an organic group of the formula —X$^1$-Q-X$^2$—, wherein X$^1$, X$^2$ are each independently selected from a single bond and alkyl, and Q is selected from alkyl, —O—, —C(=O)—O—, —O—C(=O)—, and amino; n is 2; m is 1 and Z—F is an epoxycycloalkyl group, in some examples Z—F is an epoxycyclohexyl group. In some examples, in formula (I) Y is a single bond, X is an organic group of the formula —X$^1$-Q-X$^2$—, wherein X$^1$, X$^2$ are each independently selected from a single bond and C$_{1-4}$ alkyl, and Q is selected from C$_{1-4}$ alkyl, —O—, —C(=O)—O—, —O—C(=O)—; n is 2; m is 1 and Z—F is an epoxycyclohexyl group, optionally a 3,4 epoxycyclohexylgroup. In some examples, Y is a single bond, X is an organic group of the formula —X$^1$-Q-X$^2$—, wherein one of X$^1$ and X$^2$ is a single bond and the other of X$^1$ and X$^2$ is C$_{1-4}$ alkyl, and Q is selected —O—, —C(=O)—O—, —O—C(=O)—; n is 2; m is 1 and Z—F is an epoxycyclohexyl group, optionally a 3,4 epoxycyclohexylgroup.

In some examples, the crosslinking agent is selected from 1,2,7,8-diepoxy octane, trimethylolpropane triglycidyl ether, resorcinol diglycidyl ether, N,N-diglycidyl-4-glycidyloxyaniline, 4,4'-methylenebis(N,N-diglycidylaniline), tris(4-hydroxyphenyl)methane triglycidyl ether, diglycidyl 1,2-cyclohexanedicarboxylate, 1,4-cyclohexanedimethanol diglycidyl ether (which may be mixture of cis and trans), tris(2,3-epoxypropyl) isocyanurate, neopentyl glycol diglycidyl ether, bisphenol A diglycidyl ether, bisphenol A propoxylate diglycidyl ether, 3,4-epoxycyclohexyl methyl 3,4-epoxycyclohexanecarboxylate, poly[(o-cresyl glycidyl ether)-co-formaldehyde], poly(ethylene-co-glycidyl methacrylate), poly(ethylene-co-methyl acrylate-co-glycidyl methacrylate), poly(bisphenol A-co-epichlorohydrin) glycidyl end-capped, poly(ethylene glycol) diglycidyl ether, poly(propylene glycol) and diglycidyl ether.

In some examples, the epoxy-based cross-linking agent is inactive at ambient or room temperature. In some examples, the epoxy-based cross-linking agent is highly reactive at a temperature above ambient temperature. In some examples, the epoxy-based cross-linking agent is highly reactive at a temperature greater than about 50° C., for example greater than about 60° C., for example greater than about 70° C., for example greater than about 80° C., for example greater than about 90° C., for example greater than about 100° C., for example about 110° C.

In some examples, the epoxy-based cross-linking agent is compatible with the carrier liquid of the varnish composition. In one example, the epoxy-based cross-linking agent is soluble in the carrier liquid of the varnish composition. In one example, the cross-linking agent is 3,4-epoxycyclohexylmethyl 3,4-epoxycyclohexanecarboxylate.

Other Additives

The electrostatic varnish composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the varnish film to the print substrate, e.g. from an intermediate transfer member, which may be a heated blanket.

Making/Using the Composition

The varnish composition described herein may be manufactured by a method involving any suitable number of processes. FIG. 1 provides a flowchart showing the processes involved in one example method of manufacturing the electrophotographic varnish composition described herein. As shown in the figure, the method may comprise heating a thermoplastic resin mixture until the thermoplastic resin mixture is at least partially melted (S101). The thermoplastic resin mixture may be any of these described herein. For example, the mixture may comprise a first polymeric resin comprising an ethylene-based polymer; and a second polymeric resin comprising a polyamide.

The method may further comprise cooling the thermoplastic resin mixture to form resin particles (S102). The resin particles may be any of those described herein. The method may further comprise contacting the resin particles with a charge adjuvant to form composite particles or a mixture of particles (S103). The method may further comprise combining the composite particles or the mixture of particles with a carrier fluid to form the electrophotographic varnish composition (S104).

The method may comprise additional processes. For example, the method may further comprise printing the varnish composition as manufactured by the method described in FIG. 1. In one example, the method further comprises disposing the varnish composition over a portion of a substrate, the portion containing at least a printed liquid electrophotographic ink composition. The print may be carried by a printer—e.g., liquid electrophotographic printer.

In some examples, the surface on which the varnish layer is formed or developed may be on a rotating member, e.g. in the form of a cylinder. The surface on which the varnish is formed or developed may form part of a photo imaging plate. The method may involve passing the varnish composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles may adhere to the surface of the rotating member. The intermediate transfer member, if present, may be a rotating flexible member, which may be heated, e.g. to a temperature of from about 80° C. to about 160° C.

In some examples, the varnish composition is printed onto the print substrate after a printed image has been printed. In some examples, the varnish composition is printed in a final separation, or print step, after all print separations relating to the image have been printed. References to print separation, or print step, are to be understood as referring to a single iteration of the three major transfer processes of the printing method: to transfer of a printing composition from the binary ink developer ("BID") to the photo imaging plate ("PIP"), followed by $t_1$ transfer (or $1^{st}$ transfer) from the PIP to the intermediate transfer member ("ITM"), and finally $t_2$ transfer (or $2^{nd}$ transfer) from the ITM to the substrate. In CMYK printing, the ink formulations are printed in turn, or separately, hence print separations. In one example, the varnish composition is printed as a final separation after all CMYK ink separations have taken place, i.e. all inks have been transferred to the substrate. In one example, the varnish composition is printed simultaneously with the last ink separation.

During an electrostatic printing process, the intermediate transfer member operates at a temperature in the region of about 100° C., for example about 105° C. In the example in which the cross-linking reaction is catalyzed by the metal catalyst, this temperature is sufficient to activate the epoxy-based cross-linking agent and metal catalyst so that the varnish composition is at least partially cured, if not fully cured, at the time that it is transferred to the print substrate.

In the example in which the cross-linking reaction is catalyzed by UV radiation in the presence of a photoinitiator, the print substrate may be exposed to a UV irradiation source shortly after the varnish composition has been printed onto the substrate, and before image dryness.

The printed varnish composition described herein may be a part of an article. In one example, the article may comprise a substrate; and an image disposed over the substrate. The image may comprise at least one layer of a printed liquid electrographic ink composition, and at least one layer of electrographic varnish composition printed over the printed electrographic ink composition. The electrographic ink composition and the electrographic varnish composition may be any of those described herein. For example, the electrographic varnish composition may comprise resin particles each comprising a polymeric resin mixture. The mixture may comprise a first polymeric resin comprising an ethylene-based polymer; and a second polymeric resin comprising a polyamide. In one example, the varnish composition further comprises a charge adjuvant.

Also provided in an example is a print substrate, having printed thereon an electrophotographic varnish composition comprising a polymer resin, a metal catalyst and/or a photoinitiator and an epoxy-based cross-linking agent such that the polymer resin is cross-linked.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and copolymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition and varnish composition are printed onto the print substrate.

Non-Limiting Working Example

Materials and Methods

The base resin system ("Base") contained Nucrel 925™, Nucrel 2806™ and Bynel 2022™—three Dupont supplied resins. The base resin system does not contain pigments. The system generally satisfies the industry criteria for a varnish composition. For example, it provides good protection against scratch and rub as varnish ink, and increase in durability performance was observed when crosslink systems Epoxy based or fillers were added to the system.

The polyamide resin families are of high potential for adhesion promotion due the additional amines at their backbone. The polyamides are also more polar than the other resins that are generally used for the pre-existing electrophotographic ink systems at least in some examples. Therefore, polyamide compatibility with the apolar solvents that are used for LEP may be lower than other resins. As a result, using polyamide resins has a drying effect on the inks since it tends to repel the apolar solvents.

In this Example, Nucrel 925™ resin from Dupont was used as the main resin in the system for the test samples to contrast to the Base resin system in order to achieve the desirable durability that this resin may provide. Added to the Nucrel 925™ resin in the test samples was a thermoplastic polyamide resin to investigate the effect thereof on the adhesion to the paper. Two polyamide resin families from two different suppliers were examined in this Example, and the results show a general trend for any similar grades.

The two families were Versamid® from BASF and Macromelt® from Henkel both showed breakthrough results. All the grades that were used (Versamid® 959, Versamid® 750, Versamid® 728, Versamid® 759, Versamid® 744, Macromelt® 6201 and others grades) in general have superior adhesion ability to a wide range of substrates. Some of the formulations with those grades resulted in desirable adhesion properties that even increased the adhesion of lower coverage prints (commonly, the adhesion decreases as the coverage increases). These grades also repel apolar organic solvents, resulting in enhancement in "peeling damage tests" results, with minimal damage to other measurement of durability such as scratch and rub.

PARTICLE SIZE MEASUREMENT: Particle size measurement was performed using Malvern Mastersizer 2000 with diluted solution of ink with 0.1 dispersant. Results were analyzed using the Malvern tools by the following parameters: D50—the size of the particle that is bigger than 50% of the particles. D90—the size of the particle that is bigger than 50% of the particles. Tail1.5—the percentage of the particles with size below 1.5 μm. Tail20—the percentage of the particles with size higher than 20 μm.

VISCOSITY 8.4% TEST: Viscosity measurement was done using the cone-plate method by the Reometer, TA instruments, Model AR2000 with 11 Hz shear rate at room temperature. The ink samples were tested at 8.4% non-volatile solid ("NVS").

PEELING TEST: Peeling test was performed using fresh printed samples with different coverage of ink on the substrate. The ink coverage is changing from 100% to 400% from the top to the bottom of the page—in the case of a varnish, it changes from 200% to 500% from top to bottom). Applying onto the top of the print a 3M™ 230 adhesive tape 10 minutes after printing and peeling of the ink can reveal the adhesion strength of the ink to the substrate. (Results were checked visually).

SCRATCH TEST RESISTANCE: Scratch resistance test was performed by a Taber scratch tester model 551 using S-20 Tungsten carbide cutting tool. A square print of 400% ink coverage with YMCK separation order was scratched by the Tungsten carbide cutting tool while rotating the print and creating a circular damage on the printed substrate (results are analyzed visually and by weighting the ink debris that was removed by the cutting tool).

Physical parameters of Versamid® resins and their behavior in Isopar® were investigated—swelling and CRC-critical concentration of solubility, compared to Nucrel 925™, which is the main resin of the base resin system. The results are shown in Table 1.

TABLE 2

Particle size distribution and viscosity compared to the base resin system (Phoenix resins without pigment)

| Paste Formulation | D50 | D90 | Tail20 (μm) | Tail1.5 (μm) | Viscosity (CP) |
|---|---|---|---|---|---|
| Nucrel 925 ™:V728 (60:40) | 1.1 | 12 | 2.3 | 54 | 37 |
| Nucrel 925 ™:V759 (60:40) | 0.45 | 6 | 0.2 | 70 | 27 |
| Nucrel 925 ™:V750 (80:20) | 0.2 | 7 | 1 | 82 | 75 |
| Nucrel 925 ™:V759 (80:20) | 0.5 | 13 | 4 | 61 | 250 |
| Base:V759 (80:20) | 0.4 | 10 | 1.8 | 66 | 320 |
| Base:V750 (80:20) | 0.65 | 11 | 3 | 59 | 300 |
| Base (reference) | 0.6 | 18.7 | 8.9 | 59.1 | 315 |

It was observed that, in general, the varnish compositions containing the polyamide (Versamid®) resin had a smaller particle size than the vanish compositions comprising the Base, particularly evidenced in the Tail20 and Tail1.5 parameters. Further, the viscosity of the varnish compositions containing the polyamide resin was found to be lower than that of the Base (reference). Surprisingly, as shown in Table 2, a resin system comprising a combination of Nucrel 925™ and the polyamide resin was found to have a lower viscosity than one comprising a combination of Base with the polyamide resin.

The polyamide-containing test formulations were found also to have superior mechanical properties, as evidenced in the peeling damage test results. In the peeling test, a 3M™ tape is attached to the printed image right after printing and than it is swiftly removed peeling out some of the ink from the media with it, the amount of ink removed by that process is measured.

Figure 2:
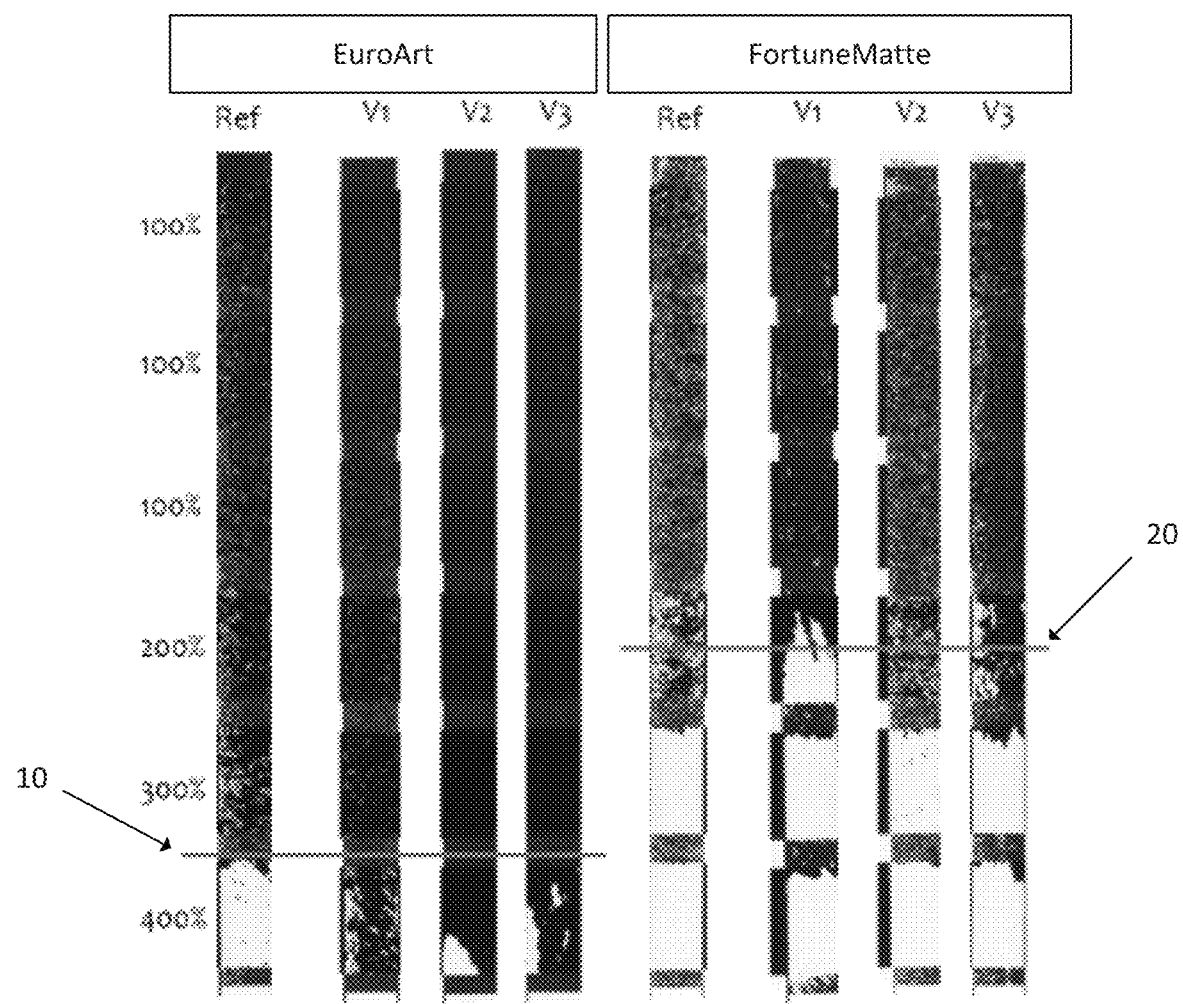
FIG. 2 shows, in one example, the peeling damage test results on two different media (EuroArt (by Sappi of USA) and FortuneMatte 135 g (by New Page of USA)).

FIG. 2 shows the peeling damage test results on two different media (EuroArt (by Sappi of USA) and Fortun-

TABLE 1

Versamid ® grades and respective properties

| Grade (Supplier: BASF) | Name | Acid Value (mg/KOH/g) | Amine Value (mg KOH/g) | Melt Viscosity (@160° C., CP) | Softening Point (° C.) | % Swelling | CRC (N~20) |
|---|---|---|---|---|---|---|---|
| Versamid ® 728 | V728 | 2 | 10 | 1450 | 100 | 10 | 8 |
| Versamid ® 750 | V750 | 3 | 6 | 725 | 116 | 8 | 47 |
| Versamid ® 759 | V759 | 12 | 2 | 250 (@ 120° C.) | 110 | 21 | — |

After grinding, the base resin system contained three resins in the following ratio: Nucrel 925™:Nucrel 2805™: Bynel 2022™=72:18:10. The base resin was used as a contrast to the varnish composition described herein, which used Nucrel 925™ resin in addition to the Versamid® resins. The Versamid® resins were added to achieve the desired adhesion and Isopar® (carrier fluid) repelling properties.

Results

Table 2 below shows the parameters of several resin particle paste formulations with different grades of Versamid® and different concentrations. It was observed that the addition of the Versamid® resins enhanced grinding and lowered the viscosity of the formulations.

eMatte 135 g (by New Page of USA))—increasing ink coverage from 100%-400%. It is noted that the samples Ref, V1, V2, and V3 refer to "Base (reference)", "Nucrel 925™: V728 (60:40)", "Nucrel 925™:V759 (60:40)", and "Nucrel 925™:V759 (80:20)", respectively, in Table 2. Reference from the left and the three representing polyamide formulations from the right. Each line pointed by an arrow is a leading line of the reference results, which are shown at 10 and 20, respectively. All the polyamide test formulations show better performances than the reference. As may be seen in FIG. 2, the addition of 20-40% of different polyamides to a formulation increased the adhesion to the paper significantly.

In this example, for the EuroArt medium the 400% coverage was completely removed at the reference sample, whereas the damage was significantly smaller in all the polyamide formulations. Moreover, there were much more holes of removed ink in all other coverages at the reference sample, whereas in all the polyamide formulations investigated smaller amount of ink was removed in all the the ink coverages. The same trend was observed in the FortuneMatte medium. The enhancement of the polyamide-containing vanish compositions described herein is surprising—at the reference sample the coverages changes fro 100% to 400%, while in all the polyamide varnish formulations the coverage is between 200% and 500%, due to the presence of the additional varnish layer.

Figure 3:
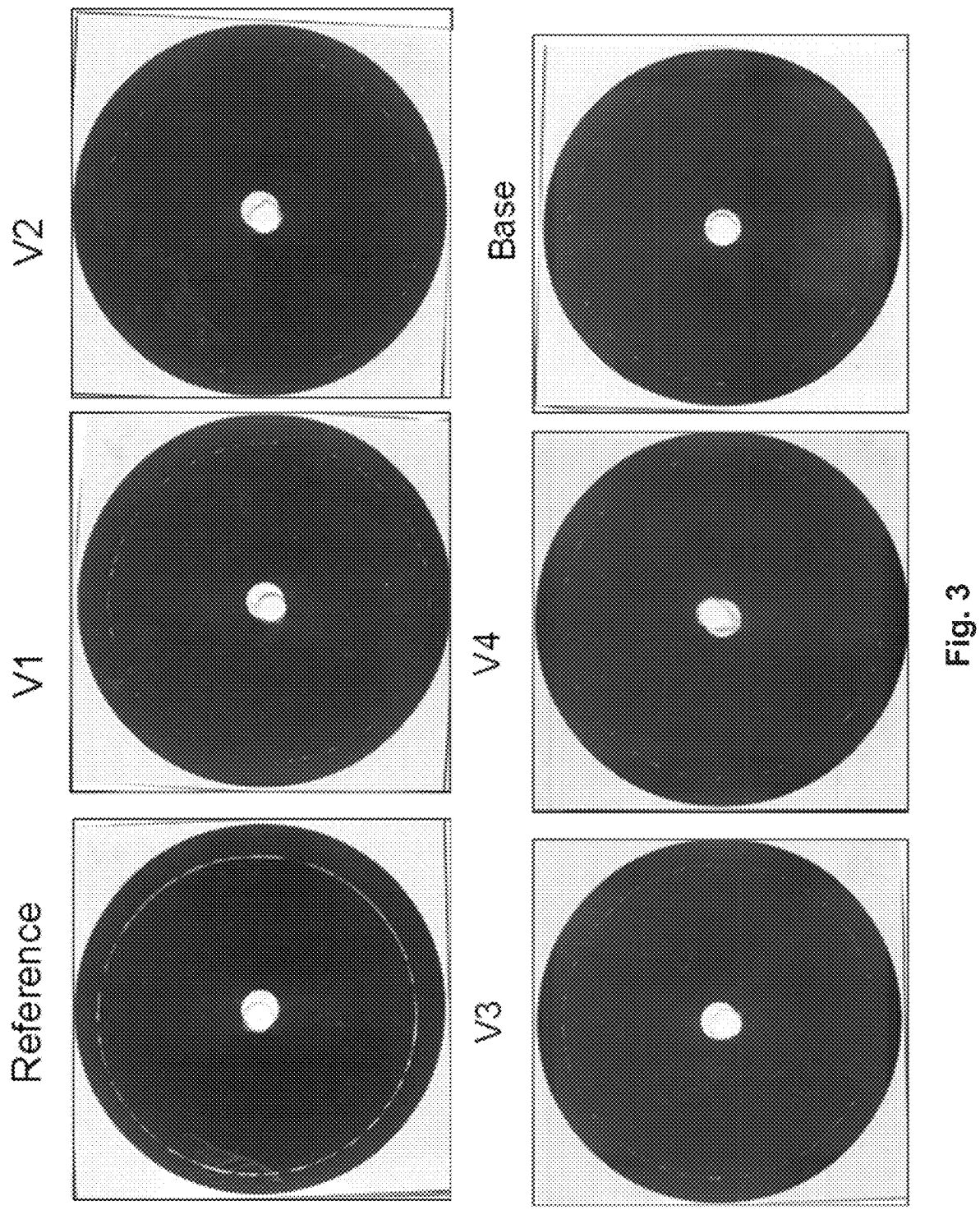
FIG. 3 shows the results of a Taber scratch test in one example.

Another important durability parameter is the the Taber scratch test result. In that test, a printed image of 400% coverage (YMCK) is scratched by a fixed middle positioned on top of a spinning table, creating a circular damage on the print. FIG. 3 illustrates the results of a Taber scratch test in this example. Specifically, FIG. 3 shows (1) a Reference ink composition (Base resin system with pigments); (2) V2 formulation (Nucrel 925™:V759 (80:20)); (3) V3 formulation (Nucrel 925™:V759 (80:20)"; (4) V4 formulation (Nucrel 925™:V750 (80:20); and (5) Base varnish formulation. It was found that all formulations exhibited better scratch resistance than the Reference ink samples and all of the varnish compositions exhibited desirable results. In particular, the formulations containing V759 (V2 and V3) appeared to exhibit lower scratch visibility than the other test samples.

Figure 4:
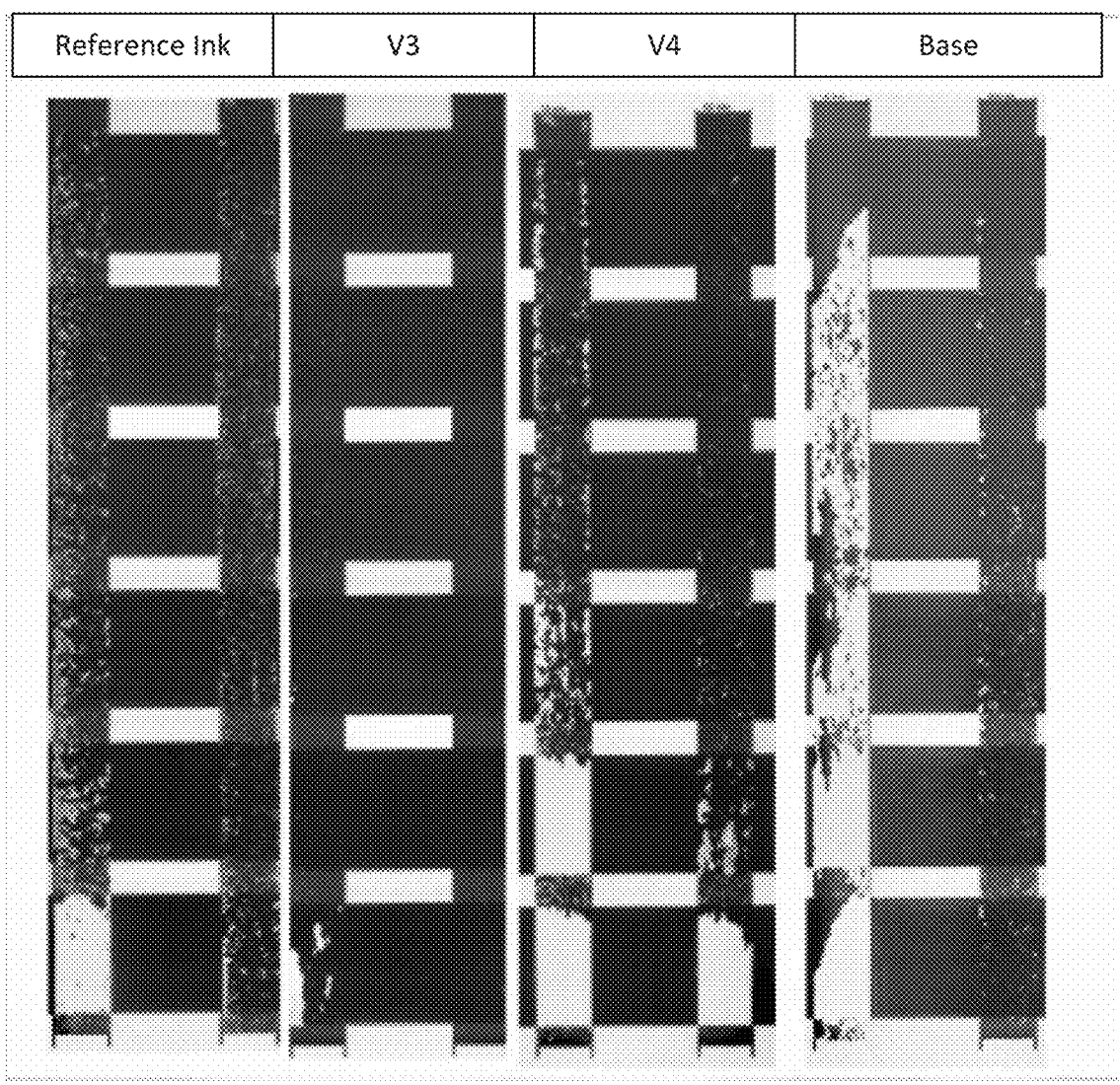
FIG. 4 shows, in one example, the peeling test results on an EuroArt ("EA") substrate after 10 min and 60 min (left—10 min, right—60 min).

FIG. 4 shows the peeling test results on an EuroArt ("EA") substrate after 10 min and 60 min (left—10 min, right—60 min). Specifically, FIG. 4 shows the peeling test results of the following inks after 10 min (left) and 60 min (right) on an EuroArt substrate (from left to right): 1) a Reference ink composition (Base resin system with pigments); 2) V2 formulation (Nucrel 925™:V759 (80:20)); 3) V4 formulation (Nucrel 925™:V750 (80:20). 4) Base varnish formulation. It was observed that the V3 formulation exhibited satisfying peeling test result—even better when compared to a reference ink composition without Varnish. The V4 formulation had slightly bad results compared to the ink composition. However, the V4 formulation had a higher coverage than the ink composition. Both V3 and V4 formulations had better results than the varnish composition with the Base resin system.

Figure 5:
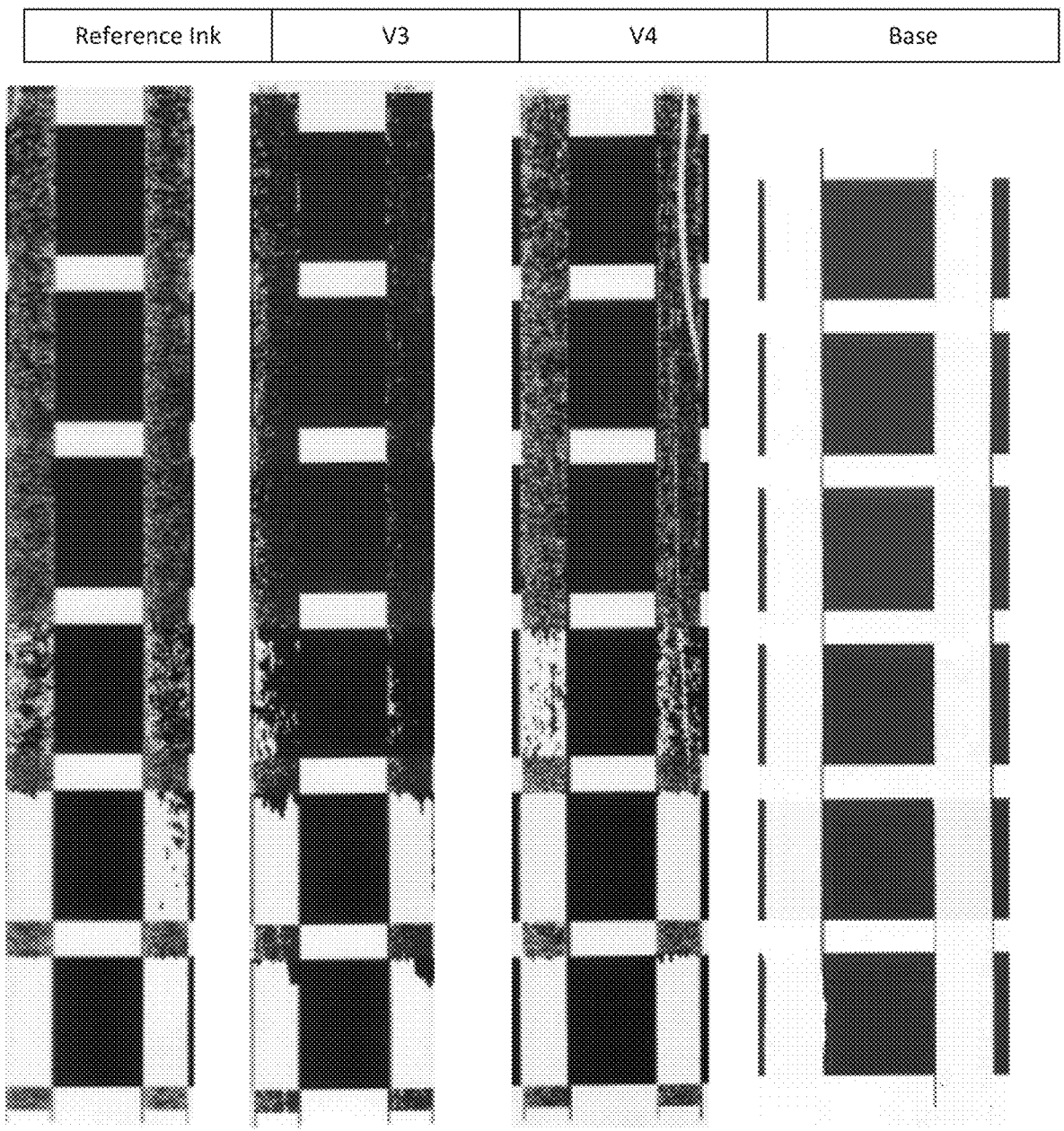
FIG. 5 shows, in one example, the peeling test results on a FortuneMatte ("FM") substrate after 10 min and 60 min (left—10 min, right—60 min).

FIG. 5 shows the peeling test results on a FortuneMatte ("FM") substrate after 10 min and 60 min (left—10 min, right—60 min). Specifically, FIG. 5 shows the peeling test results of the following inks after 10 min (left) and 60 min (right) on a FortuneMatte (FM) substrate (from left to right): 1) a Reference ink composition (Base resin system with pigments); 2) V2 formulation (Nucrel 925™:V759 (80:20)); 3) V4 formulation (Nucrel 925™:V750 (80:20); and 4) Base varnish formulation. It was observed that the V3 formulation exhibited a very impressive peeling test result even better when compared to a reference ink composition without varnish. The V4 formulation had slightly bad results compared to the ink composition. However, the V4 formulation has a higher coverage than the ink composition. Both V3 and V4 formulations had better results than the varnish composition with the Base resin system.

Additional Notes

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

What is claimed:

1. A liquid electrophotographic varnish composition, comprising:
   resin particles each comprising a polymeric resin mixture, comprising:
      a first polymeric resin comprising an ethylene-based polymer; and
      a second polymeric resin comprising a dimer acid based polyamide resin; and
   a non-polar carrier fluid, wherein the liquid electrophotographic varnish composition is substantially colorless.

2. The liquid electrophotographic varnish composition of claim 1, wherein the ethylene-based polymer is a copolymer of ethylene and methacrylic acid.

3. The liquid electrophotographic varnish composition of claim 1, wherein the second polymeric resin is more polar than the first polymeric resin.

4. The liquid electrophotographic varnish composition of claim 1, wherein the second polymeric resin comprises a thermoplastic polyamide resin.

5. The liquid electrophotographic varnish composition of claim 1, wherein the second polymeric resin is between about 20 wt % and about 40 wt % of each of the resin particles.

6. The liquid electrophotographic varnish composition of claim 1, wherein the first polymeric resin comprises only one ethylene-based polymer, and the polymeric resin mixture does not include any other ethylene-based polymer besides the ethylene-based polymer of the first polymeric resin.

7. The liquid electrophotographic varnish composition of claim 1, wherein the non-polar carrier fluid comprises an isoparraffinic compound.

8. The liquid electrophotographic varnish composition of claim 1, wherein the liquid electrophotographic varnish composition has a melt viscosity of less than or equal to about 200 CP.

9. The liquid electrophotographic varnish composition of claim 1, wherein the liquid electrophotographic varnish composition has a melt viscosity of less than or equal to about 100 CP.

10. The liquid electrophotographic varnish composition of claim 1, wherein the liquid electrophotographic varnish composition is substantially devoid of dye and pigment.

11. A method of manufacturing an electrophotographic varnish composition, the method comprising:
heating a thermoplastic resin mixture until the thermoplastic resin mixture is at least partially melted, the thermoplastic resin mixture comprising:
a first polymeric resin comprising an ethylene-based polymer; and
a second polymeric resin comprising a polyamide; and
cooling the thermoplastic resin mixture to form resin particles;
contacting the resin particles with a charge adjuvant to form composite particles or a mixture of particles; and
combining the composite particles or the mixture of particles with a non-polar carrier fluid to form the electrophotographic varnish composition.

12. The method of manufacturing of claim 11, further comprising printing the varnish composition, the printing comprising:
disposing the varnish composition over a portion of a substrate, the portion containing at least a printed liquid electrophotographic ink composition.

13. An article, comprising:
a substrate; and
an image disposed over the substrate, the image comprising at least one layer of a printed liquid electrographic ink composition, and at least one layer of electrographic varnish composition printed over the printed electrographic ink composition;
wherein the electrographic varnish composition comprises:
resin particles each comprising a polymeric resin mixture, comprising:
a first polymeric resin comprising an ethylene-based polymer; and
a second polymeric resin comprising a polyamide.

14. The article of claim 13, wherein the electrographic varnish composition further comprises a charge adjuvant.

* * * * *